(12) United States Patent
Utsugi

(10) Patent No.: US 8,149,293 B2
(45) Date of Patent: Apr. 3, 2012

(54) IMAGE PROCESSING APPARATUS, IMAGING APPARATUS, IMAGE PROCESSING METHOD AND PROGRAM RECORDING MEDIUM

(75) Inventor: Akihiko Utsugi, Machida (JP)

(73) Assignee: Nikon Corporation, Tokyo (JP)

( * ) Notice: Subject to any disclaimer, the term of this patent is extended or adjusted under 35 U.S.C. 154(b) by 335 days.

(21) Appl. No.: 12/385,748

(22) Filed: Apr. 17, 2009

(65) Prior Publication Data

US 2009/0268051 A1    Oct. 29, 2009

(30) Foreign Application Priority Data

Apr. 24, 2008   (JP) ................................ 2008-113828

(51) Int. Cl.
 *H04N 5/76* (2006.01)
 *H04N 9/04* (2006.01)
(52) U.S. Cl. .................... 348/223.1; 348/272
(58) Field of Classification Search ............... 348/231.1, 348/362, 221.1, 222.1, 225.1, 223.1, 272, 348/243, 271.624–625; 382/162, 167, 195, 382/274, 266, 282, 165
See application file for complete search history.

(56) References Cited

U.S. PATENT DOCUMENTS

| | | | | |
|---|---|---|---|---|
| 5,418,574 | A  * | 5/1995 | Miyabata et al. | 348/625 |
| 7,595,825 | B2 * | 9/2009 | Tsuruoka | 348/241 |
| 7,738,044 | B2 * | 6/2010 | Arici et al. | 348/631 |
| 2007/0035641 | A1 | 2/2007 | Yamada et al. | |
| 2007/0103744 | A1 | 5/2007 | Chiba | |

FOREIGN PATENT DOCUMENTS

| | | |
|---|---|---|
| JP | A-2006-14261 | 1/2006 |
| JP | A-2007-28041 | 2/2007 |
| JP | A-2007-133592 | 5/2007 |

* cited by examiner

*Primary Examiner* — David Ometz
*Assistant Examiner* — Ahmed A Berhan
(74) *Attorney, Agent, or Firm* — Oliff & Berridge, PLC

(57) ABSTRACT

A high luminance point detecting section of an image processing apparatus detects a high luminance point of the captured image. A chroma extracting section sets a first area in the captured image with the high luminance point serving as a reference point and extracts a first chroma by using color information of the first area. Further, the chroma extracting section sets a second area at a position more apart from the high luminance point than the first area in the captured image and extracts a second chroma by using color information of the second area. A color bleeding estimating section estimates intensity of color bleeding appearing in the captured image based on a value of the first chroma relative to the second chroma.

10 Claims, 5 Drawing Sheets

GRADIENT CALCULATION FILTER FOR DOWN DIRECTION

| 1 | 2 | 1 |
|---|---|---|
| 0 | 0 | 0 |
| -1 | -2 | -1 |

Fig.3A

GRADIENT CALCULATION FILTER FOR LOWER LEFT DIRECTION

| 0 | 1 | 2 |
|---|---|---|
| -1 | 0 | 1 |
| -2 | -1 | 0 |

Fig.3C

GRADIENT CALCULATION FILTER FOR LEFT DIRECTION

| -1 | 0 | 1 |
|---|---|---|
| -2 | 0 | 2 |
| -1 | 0 | 1 |

Fig.3E

GRADIENT CALCULATION FILTER FOR UPPER LEFT DIRECTION

| -2 | -1 | 0 |
|---|---|---|
| -1 | 0 | 1 |
| 0 | 1 | 2 |

Fig.3G

GRADIENT CALCULATION FILTER FOR UP DIRECTION

| -1 | -2 | -1 |
|---|---|---|
| 0 | 0 | 0 |
| 1 | 2 | 1 |

Fig.3B

GRADIENT CALCULATION FILTER FOR UPPER RIGHT DIRECTION

| 0 | -1 | -2 |
|---|---|---|
| 1 | 0 | -1 |
| 2 | 1 | 0 |

Fig.3D

GRADIENT CALCULATION FILTER FOR RIGHT DIRECTION

| 1 | 0 | -1 |
|---|---|---|
| 2 | 0 | -2 |
| 1 | 0 | -1 |

Fig.3F

GRADIENT CALCULATION FILTER FOR LOWER RIGHT DIRECTION

| 2 | 1 | 0 |
|---|---|---|
| 1 | 0 | -1 |
| 0 | -1 | -2 |

Fig.3H

IMAGE PROCESSING APPARATUS, IMAGING APPARATUS, IMAGE PROCESSING METHOD AND PROGRAM RECORDING MEDIUM

CROSS-REFERENCE TO RELATED APPLICATION

This application is based upon and claims the benefit of priority from Japanese Patent Application No. 2008-113828, filed on Apr. 24, 2008, the entire contents of which are incorporated herein by reference.

BACKGROUND

1. Field

The present application relates to an image processing apparatus, an imaging apparatus, an image processing method, and a program recording medium for correcting color bleeding of a captured image.

2. Description of the Related Art

Conventionally, there have been proposed various methods for removing, by image processing, color bleeding ascribable to chromatic aberration of a lens in an image captured by an electronic camera. As an example, Japanese Unexamined Patent Application Publication No. 2006-14261 discloses an art in which purple pixels near a white saturation pixel are regarded as false color pixels and a purple fringe (color bleeding ascribable to chromatic aberration of short-wavelength light) is removed.

However, in the art of Japanese Unexamined Patent Application Publication No. 2006-14261, purple pixels in the vicinity of a high luminance pixel are corrected without distinction. Therefore, when, for example, there is a purple subject in the vicinity of a high luminance point, even the color of the subject is erased, and thus this art has room for improvement in terms that color bleeding is not always properly corrected. Further, the art of Japanese Unexamined Patent Application Publication No. 2006-14261 has room for improvement in terms that it is not capable of coping with color bleeding other than the purple fringe.

SUMMARY

Under such circumstances, it is a proposition of one aspect of the invention to provide means for more properly correcting color bleeding while maintaining an original color structure of a subject.

An image processing apparatus according to an aspect includes an image reading section obtaining a captured image, a high luminance point detecting section, a chroma extracting section, and a color bleeding estimating section. The high luminance point detecting section detects a high luminance point having a luminance equal to or higher than a predetermined value in the captured image. The chroma extracting section sets a first area in the captured image with the high luminance point serving as a reference point and extracts a first chroma representing a chroma of an area near the high luminance point by using color information of the first area. Further, the chroma extracting section sets a second area at a position more apart from the high luminance point than the first area in the captured image and extracts a second chroma representing a chroma of an area more apart from the high luminance point than the first area by using color information of the second area. The color bleeding estimating section estimates intensity of color bleeding appearing in the captured image based on a value of the first chroma relative to the second chroma.

In the above aspect, the chroma extracting section may set a plurality of combinations of the first area and the second area, with the first area and the second area in each of the combinations being different in distance from the high luminance point. Further, the color bleeding estimating section may obtain the intensity of the color bleeding corresponding to each of the combinations of the first area and the second area and estimate the intensity of the color bleeding with each width.

The image processing apparatus of the above aspect may further include a luminance gradient calculating section and a direction specifying section. The luminance gradient calculating section obtains gradients of the luminance from the high luminance point to a periphery in a plurality of directions with respect to the high luminance point respectively. Further, the direction specifying section defines, as a specified direction, a direction where the luminance gets lower from the high luminance point and the gradient of the luminance is the largest, among the plural directions. Then, the chroma extracting section may set a position of the first area and a position of the second area, respectively, based on a position of the high luminance point and the specified direction.

At this time, the chroma extracting section may execute an extracting process of the first chroma and the second chroma when the gradient of the luminance in the specified direction is larger than a predetermined threshold value.

In the above aspect, the chroma extracting section may add up values of the first chromas and add up values of the second chromas which are extracted from peripheries of a plural high luminance points included in the captured image. Further, the color bleeding estimating section may estimate the intensity of the color bleeding by using a cumulative value of the first chromas and a cumulative value of the second chromas.

At this time, a plurality of divided areas may be set in the captured image. Further, the chroma extracting section may add up the values of the first chromas and add up the values of the second chromas in each of the divided areas. Then, the color bleeding estimating section may estimate the intensity of the color bleeding in each of the divided areas by using the cumulative value of the first chromas and the cumulative value of the second chromas.

The image processing apparatus of the above aspect may further include a color bleeding correcting section. The color bleeding correcting section applies at least one of a chroma reduction process and a chrominance smoothing process to a vicinity of the high luminance point in the captured image based on the intensity of the color bleeding estimated by the color bleeding estimating section.

Here, an imaging apparatus including the image processing apparatus of the aspect or the structure of the image processing apparatus of the aspect converted to and expressed in forms of an image processing method, a program, and a program recording medium are effective as concrete aspects of the invention.

BRIEF DESCRIPTION OF THE DRAWINGS

FIGS. 3A to 3H are views showing examples of gradient calculation filters.

DETAILED DESCRIPTION OF THE EMBODIMENTS

Description of One Embodiment

Figure 1:
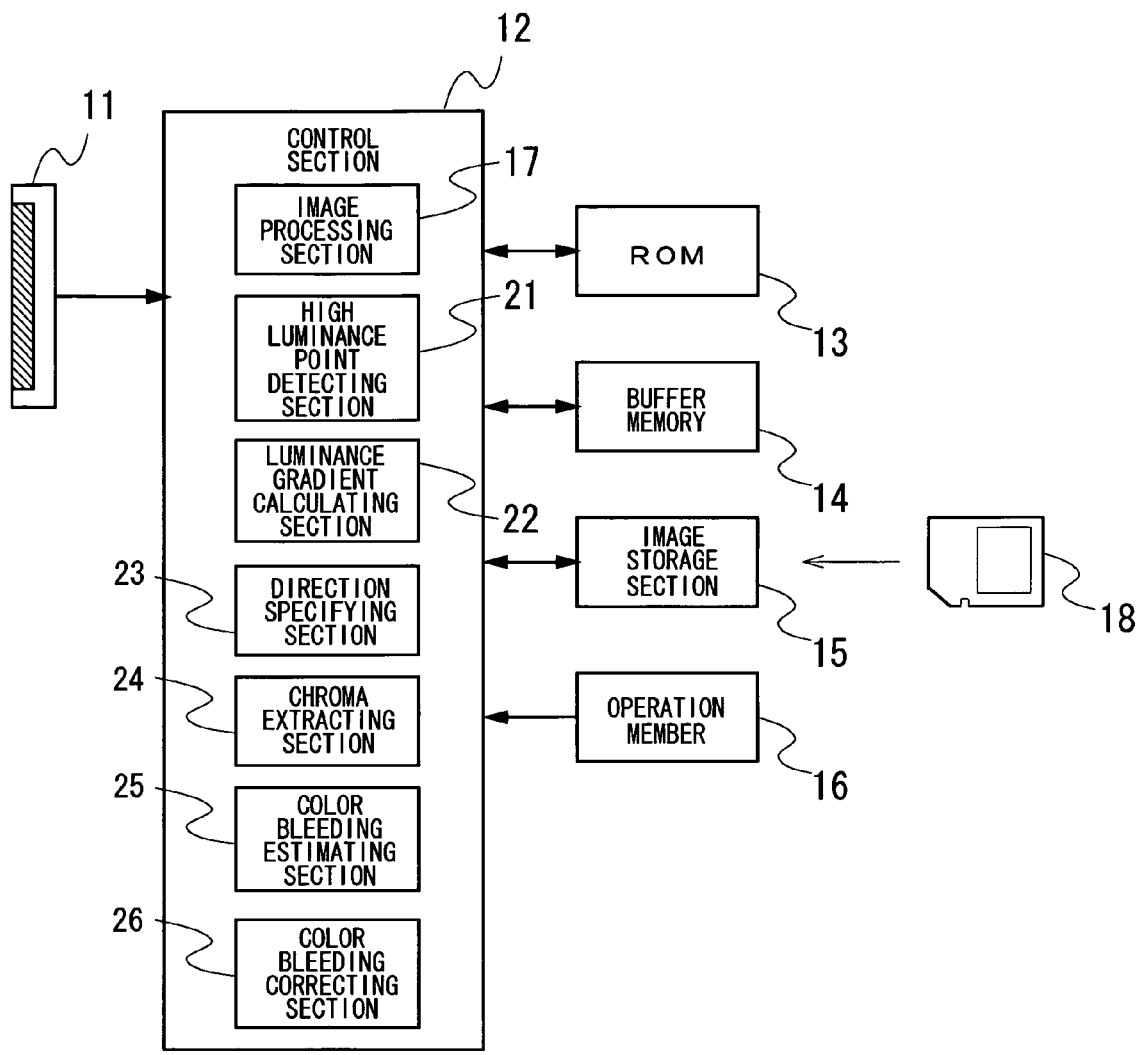
FIG. 1 is a block diagram showing a rough structure of an electronic camera of one embodiment.

FIG. 1 is a block diagram showing a rough structure of an electronic camera as an image processing apparatus of one embodiment. The electronic camera includes an imaging sensor 11, a control section 12, a ROM 13, a buffer memory 14, an image storage section 15, and an operation member 16. Here, the imaging sensor 11, the ROM 13, the buffer memory 14, the image storage section 15, and the operation member 16 are coupled to the control section 12.

The imaging sensor 11 captures an image of a subject formed by an imaging optical system (not shown) and generates image signals of the captured image. On a light-receiving surface of the imaging sensor 11, a plurality of photosensors are arranged in matrix. Further, on each of the photosensors of the imaging sensor 11, a red (R), a green (G), a blue (B) color filter are arranged according to a generally known Bayer pattern. Therefore, each of the photosensors of the imaging sensor 11 outputs image signals corresponding to the respective colors by color separation in the color filters. The image signals output from the imaging sensor 11 are input to the control section 12 via an A/D converter circuit (not shown).

The control section 12 is a processor centrally controlling the operation of the electronic camera and has an image processing section 17. The image processing section 17 applies various kinds of image processing (color interpolation process, gradation conversion process, edge enhancement process, white balance adjustment, color conversion process from an RGB color space to a YCbCr color space, and the like) to data of the captured image.

Further, the control section 12 executes programs of a color bleeding correcting process to function also as a high luminance point detecting section 21, a luminance gradient calculating section 22, a direction specifying section 23, a chroma extracting section 24, a color bleeding estimating section 25, and a color bleeding correcting section 26. The above sections will all be described later.

In the ROM 13, various kinds of programs executed by the control section 12 are stored. Further, the buffer memory 14 is formed by a volatile storage medium (SDRAM or the like) and serves to temporarily store data of an image in a pre-process and a post-process of the image processing by the control section 12. Further, in the buffer memory 14, data of various kinds of parameters necessary for the color bleeding correcting process are stored.

The image storage section 15 has a connector for coupling a nonvolatile storage medium 18. The image storage section 15 writes/reads the data of the captured image to/from the recording medium 18 coupled to the connector. The above storage medium 18 is formed by a hard disk, a memory card having a built-in semiconductor memory, or the like. In FIG. 1, a memory card is shown as an example of the storage medium 18.

The operation member 16 accepts various kinds of inputs to the electronic camera from a user. The operation member 16 is formed by, for example, a release button, a cross-shaped cursor key, an enter button, and the like.

Figure 2:
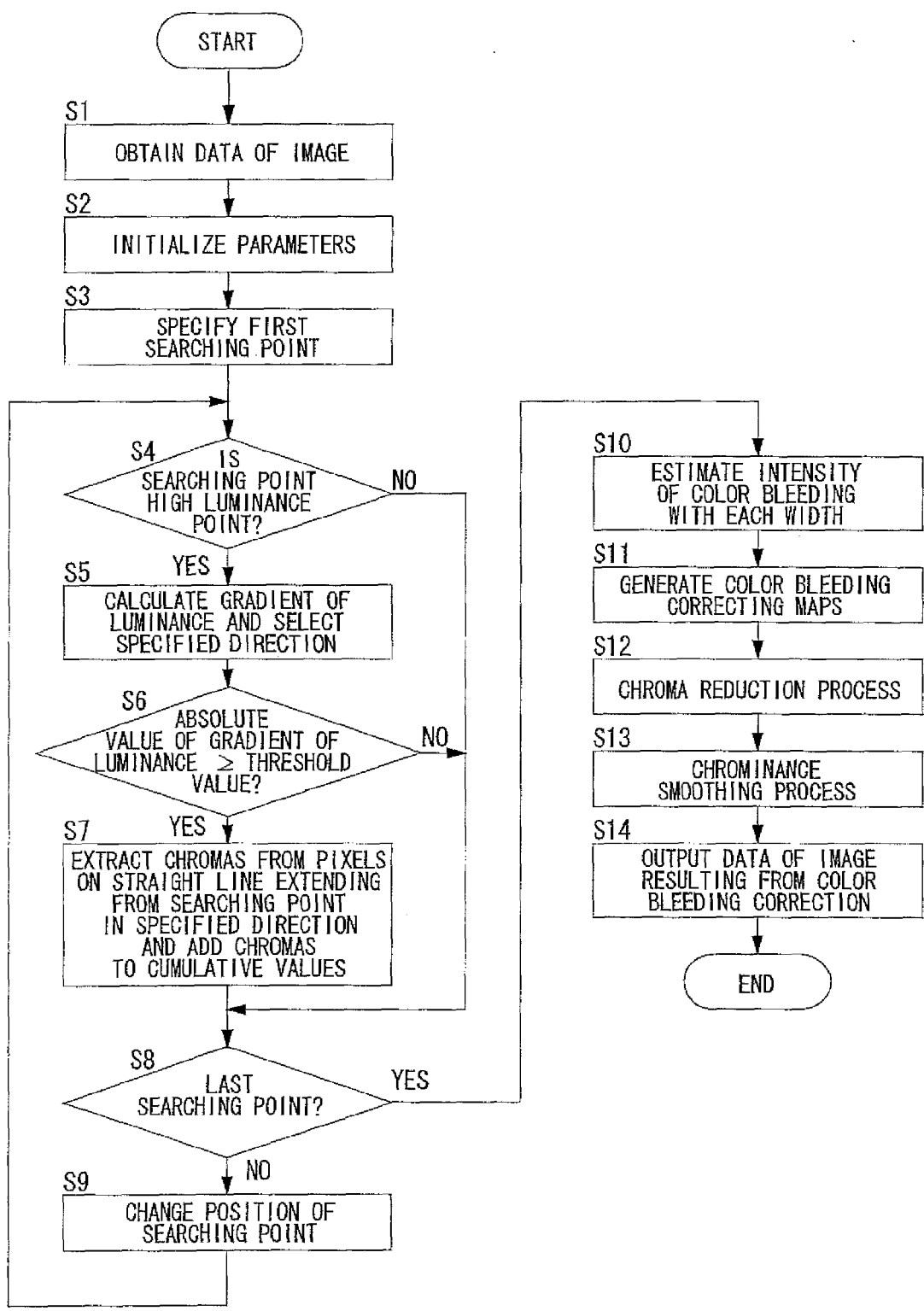
FIG. 2 is a flowchart to illustrate an operation example in a color bleeding correcting process in the one embodiment.

Next, an operation example in the color bleeding correcting process in the electronic camera of the one embodiment will be described with reference to the flowchart in FIG. 2. The color bleeding correcting process in the one embodiment is executed, for example, when the control section 12 generates data of an image for recording in response to a full pressing operation of the release button and when the control section 12 re-touches the data of the image stored in the recording medium 18 in the post process.

Step S1: The control section 12 obtains data of an image in a YCbCr format which is to be processed.

Here, when the color bleeding correcting process is executed simultaneously with the generation of an image for recording, the control section 12 captures an image of a subject by driving the imaging sensor 11 in response to the full pressing operation of the release button. Then, the image processing section 17 applies a series of the image processing to data of the image output from the imaging sensor 11. Consequently, the control section 12 obtains the data of the image in the YCbCr format.

Alternatively, when applying the color bleeding correcting process to data of an image stored in the recording medium 18, the control section 12 obtains the data of the image from the recording medium 18 via the image storage section 15. If the data read from the recording medium 18 is RAW data, the data of the image in the YCbCr format can be generated by the image processing section 17 applying predetermined image processing to the data.

Step S2: The control section 12 initializes nine parameters (n, sumCb1 to sumCb4, sumCr1 to sumCr4) relating to the color bleeding correcting process to set values of the parameters to 0 values.

Here, in "n", the number of extraction points where information on chroma is extracted from the peripheries of high luminance points is stored. Further, the eight parameters sumCb1 to sumCb4, sum Cr1 to sumCr4 are parameters for storing cumulative values of the chromas extracted from the peripheries of the high luminance points of the image.

Concretely, in "sumCb1", a cumulative value of absolute values of chrominance Cb in areas whose distance from the high luminance points is 1 to 2 pixels is stored. In "sumCb2", a cumulative value of absolute values of chrominance Cb in areas whose distance from the high luminance points is 3 to 4 pixels is stored. In "sumCb3", a cumulative value of absolute values of chrominance Cb in areas whose distance from the high luminance points is 5 to 8 pixels is stored. In "sumCb4", a cumulative value of absolute values of chrominance Cb in areas whose distance from the high luminance points is 9 to 16 pixels is stored.

Similarly, in "sumCr1", a cumulative value of absolute values of chrominance Cr in the areas whose distance from the high luminance points is 1 to 2 pixels is stored. In "sumCr2", a cumulative value of absolute values of chrominance Cr in the areas whose distance from the high luminance points is 3 to 4 pixels is stored. In "sumCb3", a cumulative value of absolute values of chrominance Cr in the areas whose distance from the high luminance points is 5 to 8 pixels is stored. In "sumCr4", a cumulative value of absolute values of chrominance Cr in the areas whose distance from the high luminance points is 9 to 16 pixels is stored.

Step S3: The control section 12 specifies a position of a pixel which is a first searching point in the image to be processed (S1). Concretely, the control section 12 at S3 specifies a pixel at an upper left corner in the image to be processed, as the first searching point. Note that the control section 12 in the one embodiment sequentially specifies, as the searching point, all the pixels from left to right starting from the upper left corner pixel row by row.

Step S4: The high luminance point detecting section 21 of the control section 12 determines whether or not the current searching point is the high luminance point. Concretely, the high luminance point detecting section 21 determines that the current searching point is the high luminance point when luminance (Y) of the current searching point is equal to or higher than a predetermined luminance threshold value. When the above requirement is satisfied (YES side), the control section 12 goes to S5. On the other hand, when the above requirement is not satisfied (NO side), the control section 12 goes to S8.

Here, color bleeding of an image prominently appears especially in the vicinity of a high luminance point. In the one embodiment, as will be described later, by analyzing the chroma of the periphery of the high luminance point, it is possible to estimate intensity of the color bleeding efficiently.

Further, the luminance threshold value at S4 is set to a value about 80% or more in a gradation range of the data of the image. As an example, when the gradation of the image to be processed is expressed by eight bits (0 to 255), the luminance threshold value is set to a value equal to or more than 200. In the above case, the luminance threshold value is preferably set to a value equal to or more than 220, and more preferably, the luminance threshold value is set to a value of about 240.

Step S5: The luminance gradient calculating section 22 of the control section 12 obtains gradients of the luminance (rate of change of luminance) from the current searching point to the periphery in a plurality of directions. Then, the direction specifying section 23 of the control section 12 defines, as a specified direction, a direction in which the luminance gets smaller from the searching point and the gradient of the luminance is the largest.

As an example, the luminance gradient calculating section 22 performs filter operation to a luminance image Y (Y-channel image of the image to be processed) by using eight kinds of gradient calculation filters whose detection directions are different from one another. Consequently, the luminance gradient calculating section 22 obtains the gradients of the luminance in eight directions (up, down, right, left, upper right, upper left, lower right, lower left) with respect to the searching point. FIG. 3A to FIG. 3H show examples of the gradient calculation filters corresponding to the respective directions.

Figure 4:
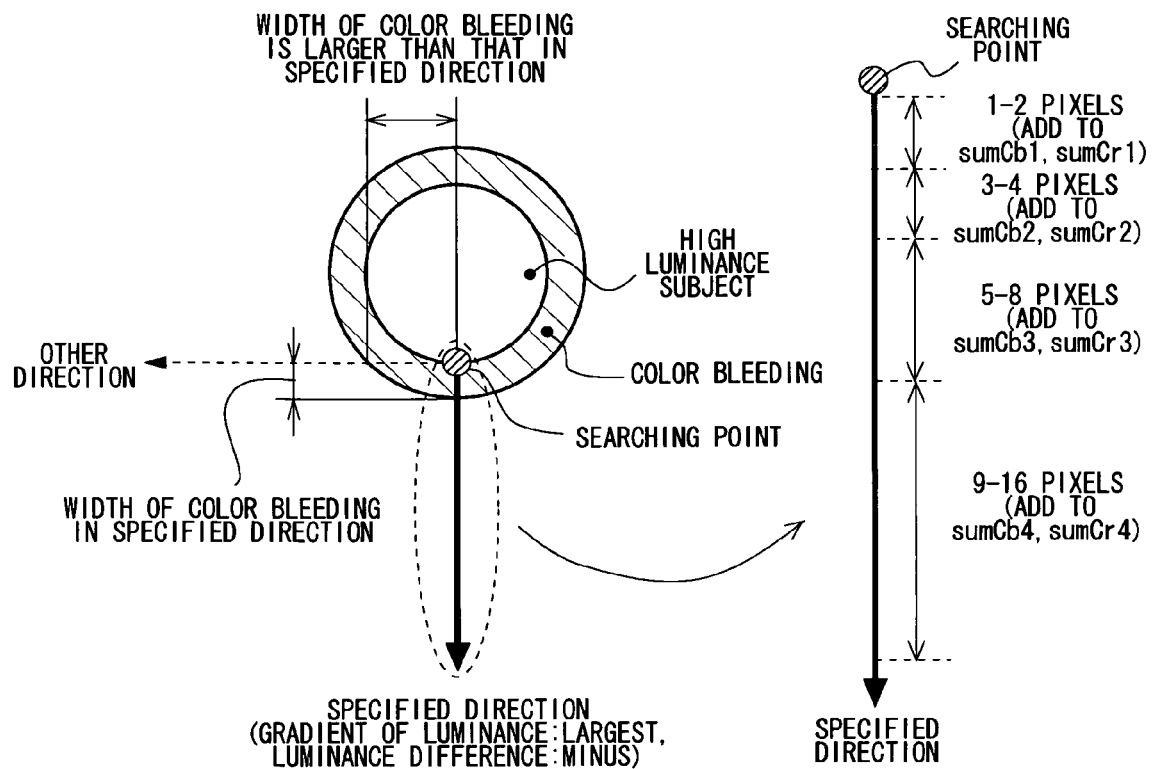
FIG. 4 is a view to illustrate an area where chroma is extracted in the periphery of a high luminance point.

Thereafter, the direction specifying section 23 selects, among the eight gradients of the luminance found by the luminance gradient calculating section 22, one showing a decrease of the luminance from the searching point (having a minus sign) and whose absolute value is the largest. Then, the direction specifying section 23 defines, as the specified direction, a direction corresponding to the selected luminance gradient. The specified direction selected at S5 by the above process matches a direction going from the center of a high luminance subject toward its outer edge (see FIG. 4).

Step S6: The chroma extracting section 24 of the control section 12 determines whether or not the absolute value of the gradient of the luminance corresponding to the specified direction (S5) is equal to or larger than a threshold value. As an example, when the gradation of the image to be processed is expressed by eight bits (0 to 255), the threshold value at S6 is set to a value of about 20.

When the above requirement is satisfied (YES side), the control section 12 goes to S7. Note that, if YES side at S6, there is a luminance difference at a certain level or more between an adjacent pixel in the specified direction and the searching point and it is thought that the current searching point is located at the outer edge of the high luminance subject.

On the other hand, when the above requirement is not satisfied (NO side), the control section 12 goes to S8. If NO side at S6, there is only a small luminance difference between the adjacent pixel in the specified direction and the searching point and it is thought that the current searching point is located on an inner side of the high luminance subject. At this time, if chromas of pixels in the periphery are extracted starting from the current searching point, accuracy in estimating the color bleeding is greatly lowered. Therefore, if NO side at S6, the chroma extracting section 24 goes to the next process without extracting the chroma from the pixels in the periphery of the current searching point.

Step S7: The chroma extracting section 24 of the control section 12 extracts chromas from pixels on a straight line extending in the specified direction from the searching point in order to analyze the color bleeding in the periphery of the high luminance point. Concretely, the chroma extracting section 24 at S7 executes the following processes.

Firstly, the chroma extracting section 24 extracts absolute values of the chrominance Cb from two pixels which are 1 to 2 pixel apart from the searching point, among the above pixels, and adds an average value thereof to sumCb1. Similarly, the chroma extracting section 24 extracts absolute values of the chrominance Cr from the two pixels which are 1 to 2 pixel apart from the searching point, among the above pixels, and adds an average value thereof to sumCr1.

Secondly, the chroma extracting section 24 extracts absolute values of the chrominance Cb from two pixels which are 3 to 4 pixel apart from the searching point, among the above pixels, and adds an average value thereof to sumCb2. Similarly, the chroma extracting section 24 extracts absolute values of the chrominance Cr from the two pixels which are 3 to 4 pixel apart from the searching point, among the above pixels, and adds an average value thereof to sumCr2.

Thirdly, the chroma extracting section 24 extracts absolute values of the chrominance Cb from four pixels which are 5 to 8 pixel apart from the searching point, among the above pixels, and adds an average value thereof to sumCb3. Similarly, the chroma extracting section 24 extracts absolute values of the chrominance Cr from the four pixels which are 5 to 8 pixel apart from the searching point, among the above pixels, and adds an average value thereof to sumCr3.

Fourthly, the chroma extracting section 24 extracts absolute values of the chrominance Cb from eight pixels which are 9 to 16 pixel apart from the searching point, among the above pixels, and adds an average value thereof to sumCb4. Similarly, the chroma extracting section 24 extracts absolute values of the chrominance Cr from the eight pixels which are 9 to 16 pixel apart from the searching point, among the above pixels, and adds an average value thereof to sumCr4.

Then, the chroma extracting section 24 increments the value of n representing the number of the extraction points where information on the chroma is extracted.

Note that the straight line extending from the searching point in the specified direction matches the direction going from the center of the high luminance subject toward its outer edge. Therefore, a width of the color bleeding in the specified direction is smaller than those in directions other than the specified direction, and thus there is a less risk that the width of the color bleeding is determined as larger than actual width (see FIG. 4).

Step S8: The control section 12 determines whether or not the position of the current searching point is a position of the last searching point (pixel at the lower right corner of the image). When the above requirement is satisfied (YES side), the control section 12 goes to S10. On the other hand, when the above requirement is not satisfied (NO side), the control section 12 goes to S9.

Step S9: The control section 12 shifts the position of the searching point to the next pixel. For example, the control section 12 changes the position of the searching point to the next pixel on the right. When the current searching point is a pixel at a right end of the image, the control section 12 defines a left end pixel on the next row below as the next searching point. Thereafter, the control section 12 returns to S4 to repeat the above operation.

Step S10: The color bleeding estimating section 25 of the control section 12 estimates the intensity of the color bleeding with each width in the periphery of the high luminance point. Concretely, the color bleeding estimating section 25 at S10 executes the following processes.

Firstly, regarding a Cb component, the color bleeding estimating section 25 obtains "strCb1" representing the intensity of the color bleeding with a 2-pixel width by the following expression (1). Further, regarding a Cr component, the color bleeding estimating section 25 obtains "strCr1" representing the intensity of the color bleeding with a 2-pixel width by the following expression (2).

$$\text{str}Cb1 = \max(\{\text{sum}Cb1 - \text{sum}Cb2\}/n, 0) \quad (1)$$

$$\text{str}Cr1 = \max(\{\text{sum}Cr1 - \text{sum}Cr2\}/n, 0) \quad (2)$$

Secondly, regarding a Cb component, the color bleeding estimating section 25 obtains "strCb2" representing the intensity of the color bleeding with a 4-pixel width by the following expression (3). Further, regarding a Cr component, the color bleeding estimating section 25 obtains "strCr2" representing the intensity of the color bleeding with a 4-pixel width by the following expression (4).

$$\text{str}Cb2 = \max(\{\text{sum}Cb2 - \text{sum}Cb3\}/n, 0) \quad (3)$$

$$\text{str}Cr2 = \max(\{\text{sum}Cr2 - \text{sum}Cr3\}/n, 0) \quad (4)$$

Thirdly, regarding a Cb component, the color bleeding estimating section 25 obtains "strCb3" representing the intensity of the color bleeding with an 8-pixel width by the following expression (5). Further, regarding a Cr component, the color bleeding estimating section 25 obtains "strCr3" representing the intensity of the color bleeding with an 8-pixel width by the following expression (6).

$$\text{str}Cb3 = \max(\{\text{sum}Cb3 - \text{sum}Cb4\}/n, 0) \quad (5)$$

$$\text{str}Cr3 = \max(\{\text{sum}Cr3 - \text{sum}Cr4\}/n, 0) \quad (6)$$

In this specification, "max(A, 0)" represents a function giving the maximum value between A and 0. Therefore, a value of max (A, 0) is A when A is plus and is a 0 value when A is a minus or 0 value.

Here, the process at S10 will be described on assumption that the color bleeding with a 2-pixel width is appearing in the image to be processed. In the above case, the chroma of the image is large in the area whose distance from the high luminance point is 1 to 2 pixels. As a result, the values of sumCb1 and sumCr1 representing the chroma in the area whose distance from the high luminance point is 1 to 2 pixels become large. On the other hand, the values of sumCb2 and sumCr2 representing the chroma in the area whose distance from the high luminance point is 3 to 4 pixels are relatively smaller than the values of sumCb1 and sumCr1. Therefore, by obtaining a difference between sumCb1 and sumCb2 (similarly, a difference between sumCr1 and sumCr2), it is possible to estimate the intensity of the color bleeding with a 2-pixel width.

Further, in the above-described case, in the area whose distance from the high luminance point is 3 pixels or more, the chroma of the image does not change due to the color bleeding. Therefore, three values of sumCb2 to sumCb4 (similarly, three values of sumCr2 to sumCr4) are close to one another, and the calculation results of the expression (3) to the expression (6) are extremely small values. It is understood also from this that, in the one embodiment, the intensity of the color bleeding with each width can be accurately estimated. It goes without saying that, even if widths of the color bleeding of the image differ, the intensity of the color bleeding with each width can be estimated in the same way as in the above-described case.

Further, a case where there is a high-chroma subject in the vicinity of the high luminance point in the above-described case will be studied. In this case, sumCb1 (or sumCr1) has a large value, and sumCb2 (or sumCr2) also has a large value. Therefore, the value of strCb1 (or strCr1) representing the intensity of the color bleeding with a 2-pixel width has a substantially 0 value. It is understood from this that it is possible to inhibit color of the subject located in the vicinity of the high luminance point from being erased at the time of a later-described process by the color bleeding correcting section 26.

Step S11: The color bleeding correcting section 26 of the control section 12 generates color bleeding correcting maps. Concretely, the color bleeding correcting section 26 at S11 executes the following processes (a) to (f).

(a) The color bleeding correcting section 26 N-multiplies a luminance value of each high luminance point in the luminance image Y to generate a luminance image Y0. A value of the above N is set to, for example, about "4".

A reason why the luminance value of the high luminance point is N-multiplied here to generate the luminance image Y0 is as follows. Generally, a high luminance point of a captured image is often in a white saturation state and a luminance value of the high luminance point is often a smaller value compared with actual brightness of a subject. The above original brightness of the high luminance point is equal to or more than several times as high as brightness represented by the luminance value. Color bleeding of the captured image is especially enhanced in the periphery of a subject emitting light.

Therefore, in the one embodiment, the luminance value of the high luminance point is N-multiplied so that the luminance image Y0 has brightness close to the original brightness of the subject. Consequently, it becomes possible to make the state of the image in the periphery of the high luminance point closer to the original state as well.

(b) The color bleeding correcting section 26 smoothes the luminance image Y0 by a Gaussian-type filter with a 3-pixel radius to generate a luminance image Y1.

(c) The color bleeding correcting section 26 smoothes the luminance image Y0 by a Gaussian-type filter with a 6-pixel radius to generate a luminance image Y2.

(d) The color bleeding correcting section 26 smoothes the luminance image Y0 by a Gaussian-type filter with a 9-pixel radius to generate a luminance image Y3.

(e) The color bleeding correcting section 26 calculates the following expression (7) regarding a pixel (x,y) of interest of the captured image to obtain a gradation value "mapCb(x, y)" of the pixel (x,y) of interest in the color bleeding correcting map of the Cb component. Note that the color bleeding correcting section 26 obtains values of mapCb(x,y) of all the pixels of the image to be processed to generate the color bleeding correcting map of the Cb component.

$$mapCb(x, y) = \frac{\begin{Bmatrix} strCb1 \times |Y0(x, y) - Y1(x, y)| + \\ strCb2 \times |Y0(x, y) - Y2(x, y)| + \\ strCb3 \times |Y0(x, y) - Y3(x, y)| \end{Bmatrix}}{N \times 256} \quad (7)$$

(f) The color bleeding correcting section 26 calculates the following expression (8) regarding the pixel (x,y) of interest of the captured image to obtain a gradation value "mapCr(x, y)" of the pixel (x,y) of interest in the color bleeding correcting map of the Cr component. Note that the color bleeding correcting section 26 obtains values of mapCr(x,y) of all the pixels of the image to be processed to generate the color bleeding correcting map of the Cr component.

$$mapCr(x, y) = \frac{\begin{Bmatrix} strCr1 \times |Y0(x, y) - Y1(x, y)| + \\ strCr2 \times |Y0(x, y) - Y2(x, y)| + \\ strCr3 \times |Y0(x, y) - Y3(x, y)| \end{Bmatrix}}{N \times 256} \quad (8)$$

The above expression (7) and expression (8) are examples when the gradation of the image to be processed is expressed by eight bits. For example, when the gradation of the image to be processed is expressed by 16 bits, the denominators of the above expression (7) and expression (8) are (N×65536).

As described above, the color bleeding correcting section 26 at S11 smoothes the luminance image Y0 by the smoothing filters with the filter sizes corresponding to the widths of the color bleeding to generate the luminance images Y1 to Y3 respectively. Note that the sizes of the above smoothing filters are set slightly larger than the widths of the color bleeding in order to ensure sufficient effect of removing the color bleeding.

Further, the color bleeding correcting section 26 generates the color bleeding correcting maps by using the differences between the original luminance image Y0 and the luminance images Y1 to Y3.

Here, the color bleeding of the captured image appears when a color component of the high luminance point is blurred to spread to its periphery. For example, when the color bleeding of an R component appears due to a difference in intensity of blurring among RGB, the state of a gradation value of the chrominance Cr is as shown in FIG. 5A.

Figure 5A:
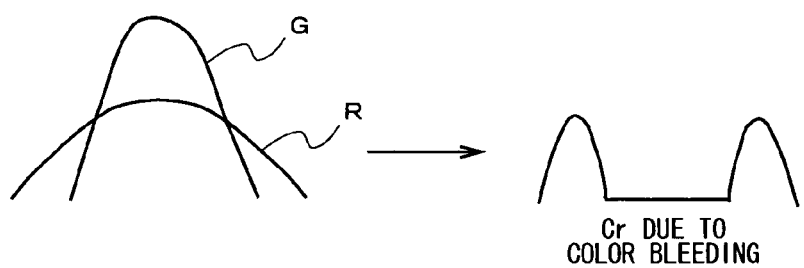
FIG. 5A is a chart showing a state of color bleeding.
Figure 5B:
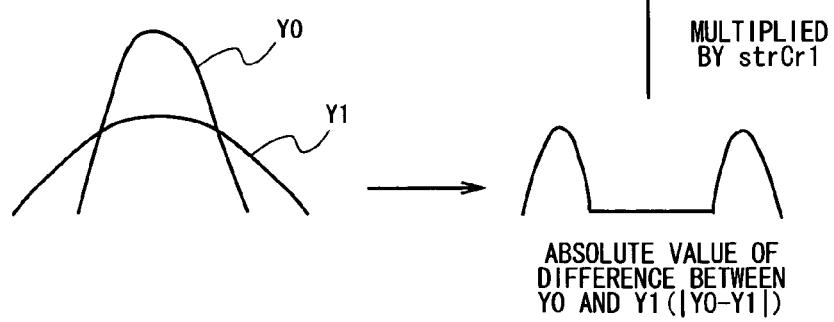
FIG. 5B is a chart showing a difference between luminance images Y0 and Y1.

On the other hand, an absolute value of the difference between the original luminance image Y0 and the luminance image Y1 corresponds to a change of the image ascribable to the blurring and its waveform approximates that in FIG. 5A (see FIG. 5B). It is seen that it is possible to fully reproduce the state of the color bleeding by multiplying the absolute value of the difference between the luminance image Y0 and the luminance image Y1 by an estimated value of the color bleeding (for example, strCr1). Therefore, at S11 in the one embodiment, the luminance components are smoothed to obtain the difference therebetween, whereby the blurring of the color component is reproduced.

Step S12: The color bleeding correcting section 26 reduces chromas of chrominance images Cb, Cr (images of Cb and Cr channels of the image to be processed) based on the color bleeding correcting maps (S11). Concretely, the color bleeding correcting section 26 reduces the absolute values of the chrominance from the chrominance images Cb, Cr by values in the color bleeding correcting maps. In this manner, the color bleeding correcting section 26 generates chrominance images Cb2, Cr2.

For example, the color bleeding correcting section 26 calculates one of the following expression (9) and the following expression (10) to obtain a gradation value "Cb2(x,y)" of the pixel (x,y) of interest of the chrominance image Cb2.
When Cb(x,y)<0, $$Cb2(x,y)=\min(Cb(x,y)+mapCb(x,y),0) \quad (9)$$

When Cb(x,y)≧0, $$Cb2(x,y)=\max(Cb(x,y)-mapCb(x,y),0) \quad (10)$$

Further, the color bleeding correcting section 26 calculates one of the following expression (11) and the following expression (12) to obtain a gradation value "Cr2(x,y)" of the pixel (x,y) of interest of the chrominance image Cr2.
When Cr(x,y)<0, $$Cr2(x,y)=\min(Cr(x,y)+mapCr(x,y),0) \quad (11)$$

When Cr(x,y)≧0, $$Cr2(x,y)=\max(Cr(x,y)-mapCr(x,y),0) \quad (12)$$

It is assumed here that the color bleeding correcting section 26 at S12 obtains the values of Cb2(x,y), Cr2(x,y) in all the pixels of the image to be processed. Note that in this specification, "min(A, 0)" represents a function giving the minimum value between A and 0.

Step S13: The color bleeding correcting section 26 smoothes the chrominance images Cb2, Cr2 by a Gaussian-type filter with an about 12-pixel radius. Images resulting from the smoothing will be called chrominance images Cb3, Cr3. Thereafter, the color bleeding correcting section 26 generates chrominance images Cb4, Cr4 by using the chrominance images Cb3, Cr3.

Concretely, the color bleeding correcting section 26 calculates one of the following expression (13) and the following expression (14) to obtain a gradation value "Cb4(x,y)" in the pixel (x,y) of interest of the chrominance image Cb4.
When Cb2(x,y)<Cb3(x,y), $$Cb4(x,y)=\min(Cb2(x,y)+mapCb(x,y),Cb3(x,y)) \quad (13)$$

When Cb2(x,y)≧Cb3(x,y), $$Cb4(x,y)=\max(Cb2(x,y)-mapCb(x,y),Cb3(x,y)) \quad (14)$$

Further, the color bleeding correcting section 26 calculates one of the following expression (15) and the following expression (16) to obtain a gradation value "Cr4(x,y)" in the pixel (x,y) of interest of the chrominance image Cr4.
When Cr2(x,y)<Cr3(x,y), $$Cr4(x,y)=\min(Cr2(x,y)+mapCr(x,y),Cr3(x,y)) \quad (15)$$

When Cr2(x,y)≧Cr3(x,y), $$Cr4(x,y)=\max(Cr2(x,y)-mapCr(x,y),Cr3(x,y)) \quad (16)$$

It is assumed that the color bleeding correcting section 26 at S13 obtains the values of Cb4(x,y), Cr4(x,y) in all the pixels of the image to be processed.

The color bleeding correcting section 26 at S13 further smoothes the chrominance images Cb2, Cr2 to generate the chrominance images Cb3, Cr3. Then, the color bleeding correcting section 26 limits the smoothing effect by the expression (13) to the expression (16) so that changes in chrominance in the chrominance images Cb3, Cr3 ascribable to the smoothing become equal to or smaller than the values of the color bleeding correction maps. By the smoothing at S13, the color bleeding correcting section 26 further removes the color bleeding which is left after the chroma reduction process at S12 and further corrects a correction trace which appears due to excessive reduction of the chroma. Consequently, it is possible to reproduce natural color structures in the chrominance images Cb4, Cr4.

Note that since the effect of the above smoothing at S13 is applied only to a point whose corresponding point has a value in the color bleeding correcting map, and therefore the color structure of a point without any color bleeding is kept as it is.

Step S14: The color bleeding correcting section 26 outputs data of an image made up of the luminance image Y in the initial state and the chrominance images Cb4, Cr4 (obtained at S13) as data of the image resulting from the color bleeding correcting process. The foregoing is the description of the flowchart in FIG. 2.

In the above-described electronic camera of the one embodiment, based on the difference in intensity between the chromas extracted from two areas whose distances from the high luminance point differ, the strength of the color bleeding appearing in the captured image is estimated. Then, the electronic camera generates the color bleeding correcting maps based on the estimated intensity of the color bleeding to execute the chroma reduction process and the chrominance smoothing process by using the color bleeding correcting maps.

Consequently, in the one embodiment, the captured image is corrected according to the intensity of the color bleeding and almost no color correction is made in a point without any color bleeding. Therefore, it is possible to correct the color bleeding more properly while maintaining the original color structure of the subject.

Description of Another Embodiment

Figure 6:
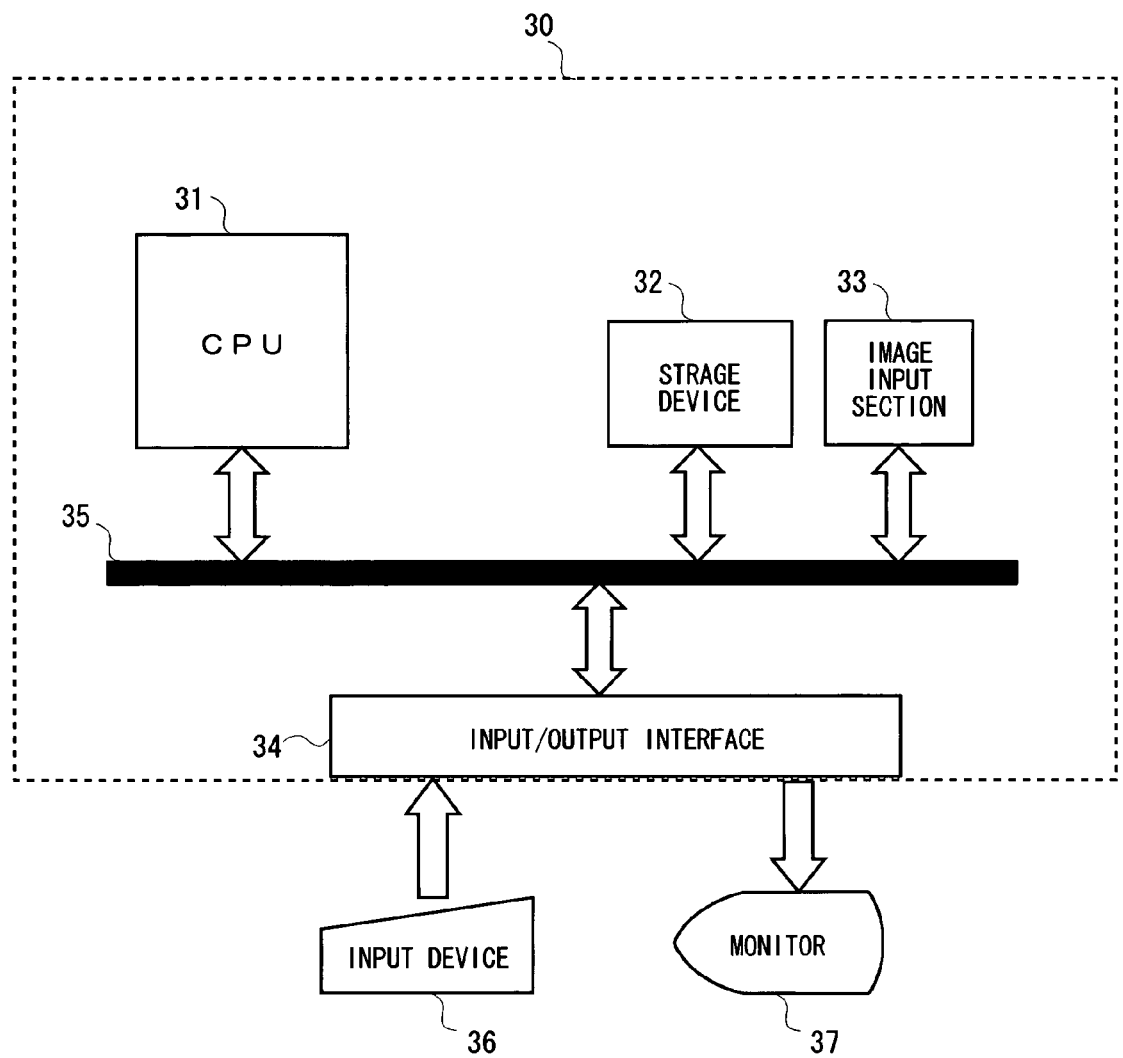
FIG. 6 is a block diagram showing a structure example of an image processing apparatus according to another embodiment.

FIG. 6 is a block diagram showing a structure example of an image processing apparatus according to another embodiment. In the other embodiment, a computer 30 executes an image processing program to realize the function of the image processing apparatus. Therefore, with the structure of the other embodiment, it is also possible to provide substantially the same effects as those of the above-described embodiment.

The computer 30 forming the image processing apparatus has a CPU 31, a storage device 32, an image input section 33, an input/output interface 34, and a bus 35. The CPU 31, the storage device 32, the image input section 33, and the input/output interface 34 are coupled to one another via the bus 35. Further, an input device 36 and a monitor 37 are coupled to the computer 30 via the input/output interface 34. The input/output interface 34 accepts various kinds of inputs from the input device 36 and outputs data for display to the monitor 37.

The CPU 31 is a processor executing the image processing program. In the other embodiment, the CPU 31 executes the image processing program to realize as software the operations of the control section 12, the image processing section 17, the high luminance point detecting section 21, the luminance gradient calculating section 22, the direction specifying section 23, the chroma extracting section 24, the color bleeding estimating section 25, and the color bleeding correcting section 26 of the one embodiment.

The storage device 32 holds the aforesaid image processing program and various kinds of data necessary for the execution of the program. The storage device 32 of the other embodiment is formed by a hard disk, a non-volatile semiconductor memory, or the like.

The image input section 33 is used when data of an image to be processed and a program to be stored in the storage device 32 are read from an external part. For example, the image input section 33 is formed by a reading device obtaining data from a removable recording medium (a reading device of an optical disk or the like) or a communication device (an USB interface, a wireless LAN module, or the like) communicating with an external device by a generally known communication standard.

Supplementary Items of Embodiments (1) In the one embodiment described above, the example where the color bleeding correcting section 26 executes both the chroma reduction process and the chrominance smoothing process is described. However, the image processing apparatus may execute one of the chroma reduction process (S12) and the chroma smoothing process (S13).

For example, when the image processing apparatus executes the chroma reduction process without executing the chrominance smoothing process, the image processing apparatus may operate as follows. In this case, the image processing apparatus omits the process at S13 after executing the processes of S1 to S12 in FIG. 2. Thereafter, the image processing apparatus at S14 may output the data of the image made up of the luminance image Y in the initial state and the chrominance images Cb2, Cr2 (obtained at S12) as the data of the image resulting from the color bleeding correcting process.

For example, when the image processing apparatus executes the chrominance smoothing process without executing the chroma reduction process, the image processing apparatus may operate as follows. In this case, the image processing apparatus omits the process at S12 after executing the processes of S1 to S11 in FIG. 2. Thereafter, the image processing apparatus at S13 smoothes the chrominance images Cb, Cr in the initial state to generate the chrominance images Cb3, Cr3. Then, the image processing apparatus at S13 may obtain Cb4(x,y) and Cr4(x,y) by the following expression (17) to the following expression (20) instead of the expression (13) to the expression (16).

When $Cb(x,y) < Cb3(x,y)$, $$Cb4(x,y) = \min(Cb(x,y) + \mathrm{map}Cb(x,y), Cb3(x,y)) \qquad (17)$$

When $Cb(x,y) \geq Cb3(x,y)$, $$Cb4(x,y) = \max(Cb(x,y) - \mathrm{map}Cb(x,y), Cb3(x,y)) \qquad (18)$$

When $Cr(x,y) < Cr3(x,y)$, $$Cr4(x,y) = \min(Cr(x,y) + \mathrm{map}Cr(x,y), Cr3(x,y)) \qquad (19)$$

When $Cr(x,y) \geq Cr3(x,y)$, $$Cr4(x,y) = \max(Cr(x,y) - \mathrm{map}Cr(x,y), Cr3(x,y)) \qquad (20)$$

(2) In the one embodiment described above, the intensity of the whole color bleeding of the image is estimated by integrating the chromas in the areas with each distance from the high luminance points in the whole image. However, the image processing apparatus may be configured to set a plurality of divided areas in the image to be processed, and in each of the divided areas, add up the chromas in areas with each distance from the high luminance points, and separately execute the aforesaid color bleeding correcting process. In this case, proper color bleeding correction can be made in each of the divided areas. Note that the aforesaid divided areas can arbitrarily be set. For example, the image processing apparatus may execute the color bleeding correcting process separately in a center area of the image and a peripheral area of the image. Alternatively, the image processing apparatus may divide the image in a 3×3 lattice form to execute the color bleeding correcting process separately in each of the divided areas.

(3) In the one embodiment described above, the image processing apparatus at S11 may generate the color bleeding correction maps in the following manner.

First, the image processing apparatus applies inverse Gamma transformation to data of an image resulting from Gamma transformation to generate a luminance image Y0' whose pixel value is proportional to an exposure amount. Next, the image processing apparatus applies the same smoothing processes as those of (b) to (d) at S11 to the image resulting from the above inverse Gamma transformation, thereby generating luminance images Y1' to Y3'. By thereafter Gamma-transforming the luminance images Y1' to Y3' followed by the calculations of (e) and (f) at S11, differences between the original luminance image Y0 and the luminance images Y1' to Y3' resulting from the Gamma transformation may be found.

This involves an increased calculation amount, but actual blurring of light amount due to chromatic aberration can be accurately reproduced.

(4) The image processing apparatus of the one embodiment described above extracts, at S7, the chromas from the pixels on the straight line extending from the high luminance point in the specified direction. However, the image processing apparatus may conversely specify an area starting from a low luminance searching point and ending at the high luminance point and extract chromas from pixels on a straight line similar to that at S7.

(5) The example is described where in the image processing apparatus of the one embodiment shown in FIG. 1, the functions of the high luminance point detecting section 21, the luminance gradient calculating section 22, the direction specifying section 23, the chroma extracting section 24, the color bleeding estimating section 25, and the color bleeding correcting section 26 are realized as software by the programs, but these structures may be of course realized as hardware by using ASIC.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing apparatus comprising:
   an image reading section that obtains a captured image;
   a high luminance point detecting section that detects a high luminance point having a luminance value equal to or higher than a predetermined value in the captured image;
   a chroma extracting section that (1) sets a first area in the captured image with the high luminance point serving as a reference point and extracts a first chroma representing a chroma of an area near the high luminance point by using color information of the first area, (2) sets a second area at a position farther apart from the high luminance point than the first area in the captured image, the second area having luminance points with a luminance value less than the predetermined value in the captured image and (3) extracts a second chroma representing a chroma of an area farther apart from the high luminance point than the first area by using color information of the second area; and
   a color bleeding estimating section that estimates intensity of color bleeding appearing in the captured image based on a value of the first chroma relative to the second chroma.

2. The image processing apparatus according to claim 1, wherein:
   the chroma extracting section sets a plurality of combinations of the first area and the second area, the first area and the second area in each of the combinations of the plurality of combinations being different in distance from the high luminance point; and
   the color bleeding estimating section obtains the intensity of the color bleeding corresponding to each of the combinations of the plurality of combinations of the first area and the second area and estimates the intensity of the color bleeding with each width.

3. The image processing apparatus according to claim 1, further comprising:
   a luminance gradient calculating section that obtains gradients of the luminance from the high luminance point to a periphery in a plurality of directions with respect to the high luminance point respectively; and
   a direction specifying section that defines, as a specified direction, a direction where the luminance gets lower from the high luminance point and the gradient of the luminance is the largest, among the plurality of directions, wherein
   the chroma extracting section sets a position of the first area and a position of the second area, respectively, based on a position of the high luminance point and the specified direction.

4. The image processing apparatus according to claim 3, wherein
   the chroma extracting section executes an extracting process of the first chroma and the second chroma when the gradient of the luminance value in the specified direction is larger than a predetermined threshold value.

5. The image processing apparatus according to claim 1, wherein:
   the chroma extracting section adds up values of the first chromas and adds up values of the second chromas which are extracted from peripheries of a plurality of high luminance points included in the captured image; and
   the color bleeding estimating section estimates the intensity of the color bleeding by using a cumulative value of the first chromas and a cumulative value of the second chromas.

6. The image processing apparatus according to claim 5, wherein:
   a plurality of divided areas are set in the captured image;
   the chroma extracting section adds up the values of the first chromas and adds up the values of the second chromas in each of the plurality of divided areas; and
   the color bleeding estimating section estimates the intensity of the color bleeding in each of the plurality of divided areas by using the cumulative value of the first chromas and the cumulative value of the second chromas.

7. The image processing apparatus according to claim 1, further comprising
   a color bleeding correcting section that applies at least one of a chroma reduction process and a chrominance smoothing process to a vicinity of the high luminance point in the captured image based on the intensity of the color bleeding estimated by the color bleeding estimating section.

8. An imaging apparatus comprising:
the image processing apparatus according to claim 1; and
an imaging section that captures an image of a subject to generate the captured image.

9. An image processing method comprising:
an image reading process obtaining a captured image;
a high luminance point detecting process detecting a high luminance point having a luminance value equal to or higher than a predetermined value in the captured image;
a chroma extracting process (1) setting a first area in the captured image with the high luminance point serving as a reference point and extracting a first chroma representing a chroma of an area near the high luminance point by using color information of the first area, and (2) setting a second area at a position more apart from the high luminance point than the first area in the captured image, the second area having luminance points with a luminance value less than the predetermined value in the captured image, and extracting a second chroma representing a chroma of an area more apart from the high luminance point than the first area by using color information of the second area; and
a color bleeding estimating process estimating intensity of color bleeding appearing in the captured image based on a value of the first chroma relative to the second chroma.

10. A non-transitory computer-readable program recording medium storing a program causing a computer to execute the processes of the image processing method according to claim 9.

* * * * *